(12) United States Patent
Matos et al.

(10) Patent No.: US 10,477,449 B2
(45) Date of Patent: Nov. 12, 2019

(54) SYSTEMS AND METHODS FOR ROUTE SELECTION IN A NETWORK OF MOVING THINGS, FOR EXAMPLE INCLUDING AUTONOMOUS VEHICLES

(71) Applicant: Veniam, Inc., Mountain View, CA (US)

(72) Inventors: Ricardo Matos, Oporto (PT); João Barros, Mountain View, CA (US)

(73) Assignee: VENIAM, INC., Mountain View, CA (US)

( * ) Notice: Subject to any disclaimer, the term of this patent is extended or adjusted under 35 U.S.C. 154(b) by 22 days.

(21) Appl. No.: 15/469,188

(22) Filed: Mar. 24, 2017

(65) Prior Publication Data

US 2018/0063767 A1  Mar. 1, 2018

Related U.S. Application Data

(60) Provisional application No. 62/379,850, filed on Aug. 26, 2016.

(51) Int. Cl.
| | | |
|---|---|---|
| *H04W 40/02* | (2009.01) | |
| *H04W 84/00* | (2009.01) | |
| *H04W 40/12* | (2009.01) | |
| *H04W 40/38* | (2009.01) | |
| *H04L 12/721* | (2013.01) | |

(52) U.S. Cl.
CPC ......... *H04W 40/026* (2013.01); *H04L 45/124* (2013.01); *H04W 40/125* (2013.01); *H04W 40/38* (2013.01); *H04W 84/005* (2013.01)

(58) Field of Classification Search
CPC . H04W 40/026; H04W 40/125; H04W 40/38; H04W 84/005; H04W 4/046; H04W 84/18; H04W 4/40; H04W 28/26; H04W 40/02; H04W 72/048; H04W 40/20; H04L 45/124
See application file for complete search history.

(56) References Cited

U.S. PATENT DOCUMENTS

| | | | | |
|---|---|---|---|---|
| 5,966,658 | A * | 10/1999 | Kennedy, III | ........ H04W 88/02 |
| | | | | 455/426.1 |
| 6,124,800 | A * | 9/2000 | Beard | ............. G06Q 10/08 |
| | | | | 340/10.1 |
| 6,295,448 | B1 * | 9/2001 | Hayes, Jr. | ............. G08C 17/02 |
| | | | | 340/12.5 |
| 6,370,397 | B1 * | 4/2002 | Popovic | ............. G01S 5/0215 |
| | | | | 370/342 |
| 9,088,613 | B2 * | 7/2015 | Wahler | ............. H04W 4/04 |
| 9,367,968 | B2 * | 6/2016 | Giraud | ............. G07C 5/008 |
| 9,587,952 | B1 * | 3/2017 | Slusar | ............. G06Q 10/00 |
| 9,671,239 | B2 * | 6/2017 | Lord | ............. G06Q 10/063114 |

(Continued)

*Primary Examiner* — Wutchung Chu
(74) *Attorney, Agent, or Firm* — McAndrews, Held & Malloy, Ltd.

(57) ABSTRACT

Communication network architectures, systems and methods for supporting a network of mobile and/or static nodes. As a non-limiting example, various aspects of this disclosure provide communication network architectures, systems, and methods for providing dynamic routing and/or selection of communication pathways in a communication network comprising a complex array of both static and moving communication nodes (e.g., the Internet of moving things), for example including a network of autonomous vehicles.

27 Claims, 12 Drawing Sheets

(56) References Cited

U.S. PATENT DOCUMENTS

| | | | |
|---|---|---|---|
| 9,755,850 B2* | 9/2017 | Stolfus | H04L 12/6418 |
| 9,992,701 B2* | 6/2018 | Egner | H04W 28/0268 |
| 2005/0137790 A1* | 6/2005 | Yamada | G01C 21/26 |
| | | | 701/533 |
| 2006/0089757 A1* | 4/2006 | Yoshimura | H04L 12/40 |
| | | | 701/2 |
| 2012/0310520 A1* | 12/2012 | Kanno | G01C 21/3423 |
| | | | 701/400 |
| 2012/0324100 A1* | 12/2012 | Tomici | H04L 45/123 |
| | | | 709/224 |
| 2013/0077562 A1* | 3/2013 | Boltz | H04B 7/18534 |
| | | | 370/316 |
| 2013/0183904 A1* | 7/2013 | Hiben | H04W 72/082 |
| | | | 455/63.1 |
| 2013/0329598 A1* | 12/2013 | DiFazio | H04W 64/003 |
| | | | 370/254 |
| 2014/0044042 A1* | 2/2014 | Moshfeghi | H04W 84/00 |
| | | | 370/328 |
| 2014/0141711 A1* | 5/2014 | Baker | H04W 40/02 |
| | | | 455/11.1 |
| 2015/0003264 A1* | 1/2015 | Ma | H04W 40/026 |
| | | | 370/252 |
| 2015/0088414 A1* | 3/2015 | Mason | G01C 21/3469 |
| | | | 701/423 |
| 2015/0256428 A1* | 9/2015 | Li | H04L 43/0811 |
| | | | 370/254 |
| 2015/0312824 A1* | 10/2015 | Thalanany | H04W 36/165 |
| | | | 455/435.1 |
| 2015/0345951 A1* | 12/2015 | Dutta | G01C 21/3605 |
| | | | 701/400 |
| 2015/0349917 A1* | 12/2015 | Skaaksrud | G06Q 10/0833 |
| | | | 370/328 |
| 2015/0358943 A1* | 12/2015 | Zawodniok | H04W 40/02 |
| | | | 370/328 |
| 2016/0269975 A1* | 9/2016 | Watanabe | H04W 40/248 |
| 2016/0286457 A1* | 9/2016 | O'hare | G01C 21/26 |
| 2017/0031364 A1* | 2/2017 | Takahashi | G01C 21/20 |
| 2017/0223733 A1* | 8/2017 | Nakata | H04W 4/029 |
| 2018/0089133 A1* | 3/2018 | She | B60R 16/023 |
| 2018/0098227 A1* | 4/2018 | Carnelli | H04W 64/003 |
| 2019/0021044 A1* | 1/2019 | Pang | H04W 48/10 |
| 2019/0059019 A1* | 2/2019 | Wallentin | H04W 28/0268 |
| 2019/0090174 A1 | 3/2019 | Rocci et al. | |

* cited by examiner

SYSTEMS AND METHODS FOR ROUTE SELECTION IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/379,850, filed on Aug. 26, 2016, and titled "Systems and Methods for Route Selection in a Network of Moving Things," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
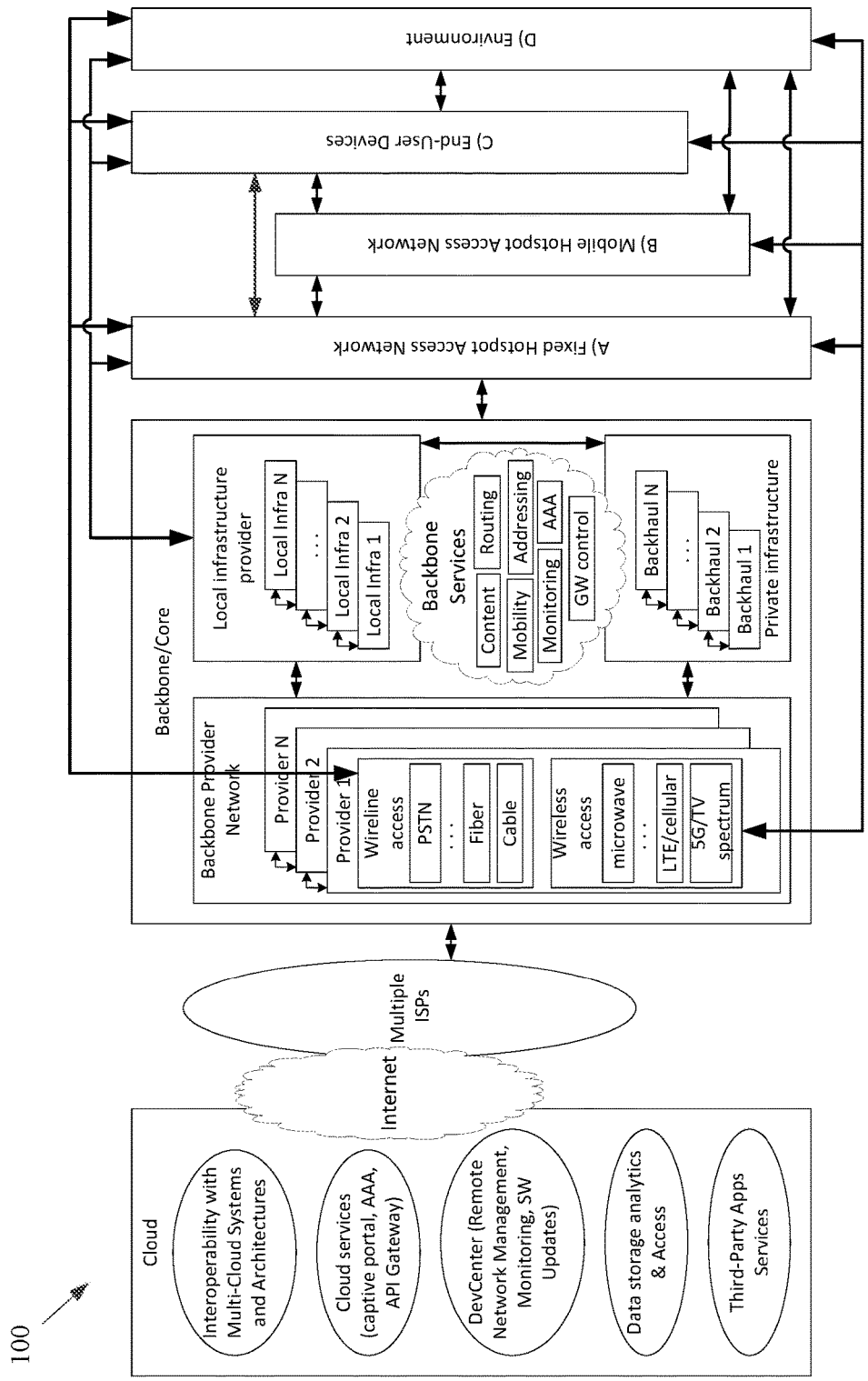
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for providing dynamic routing and/or selection of communication pathways in a communication network comprising a complex array of both static and moving communication nodes (e.g., the Internet of moving things), for example including a network of autonomous vehicles.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9

GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. The example network 100 may, for example, share any or all characteristics with the other example methods, systems, networks and/or network components 200, 300, 400, 500-570, 600, 700, 800, 900, and 1000, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
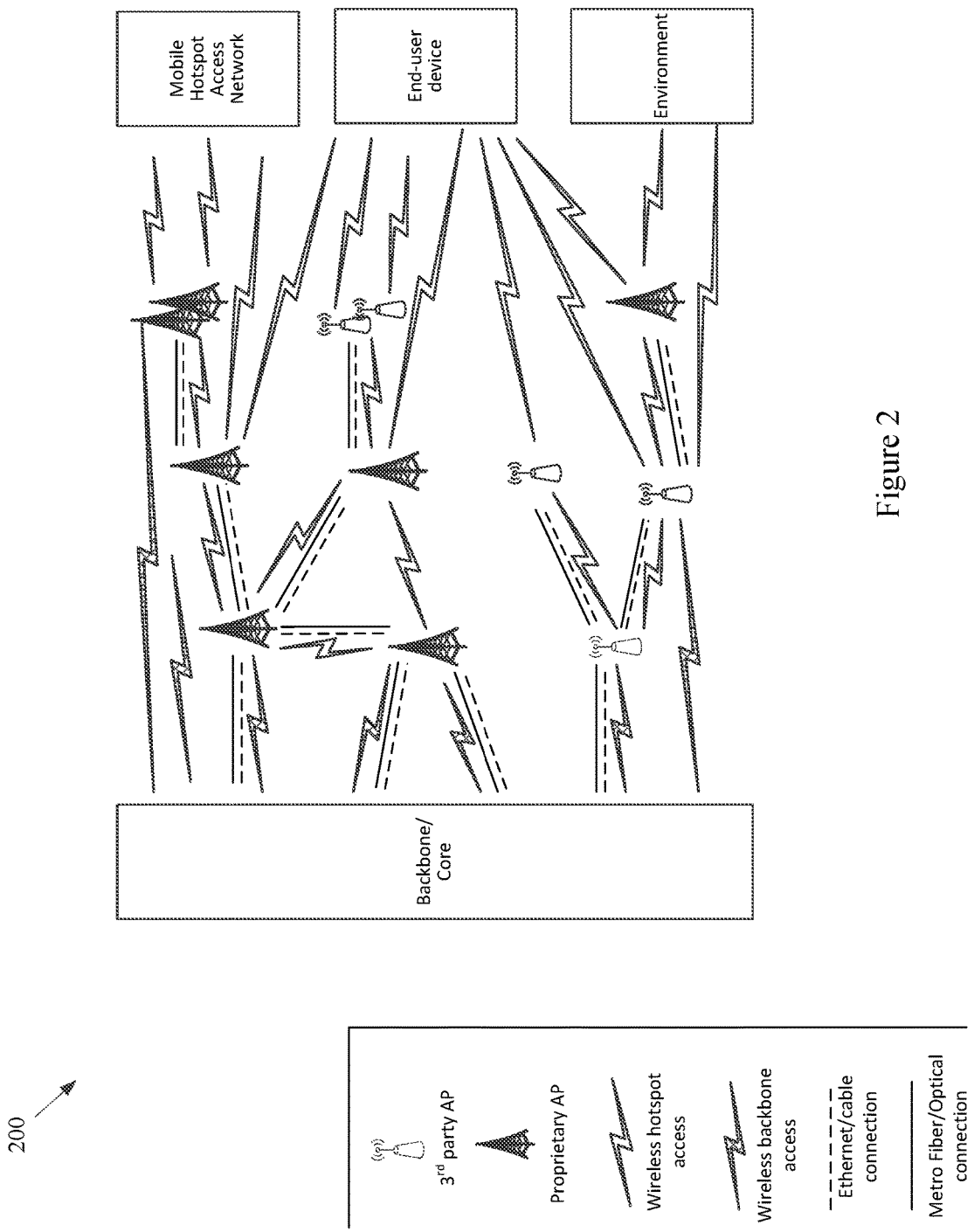
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, 600, 700, 800, 900, and 1000, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
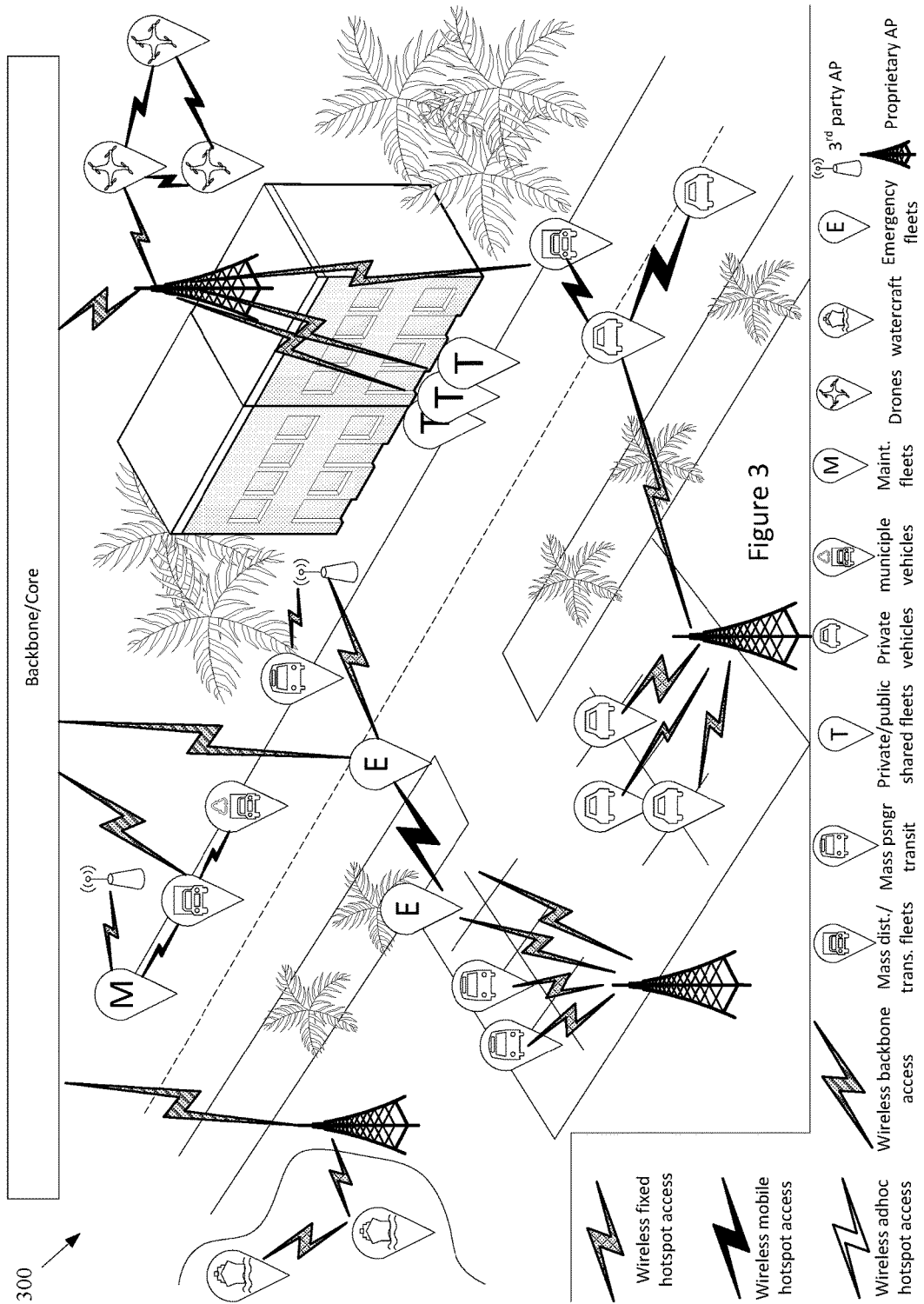
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, 600, 700, 800, 900, and 1000, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
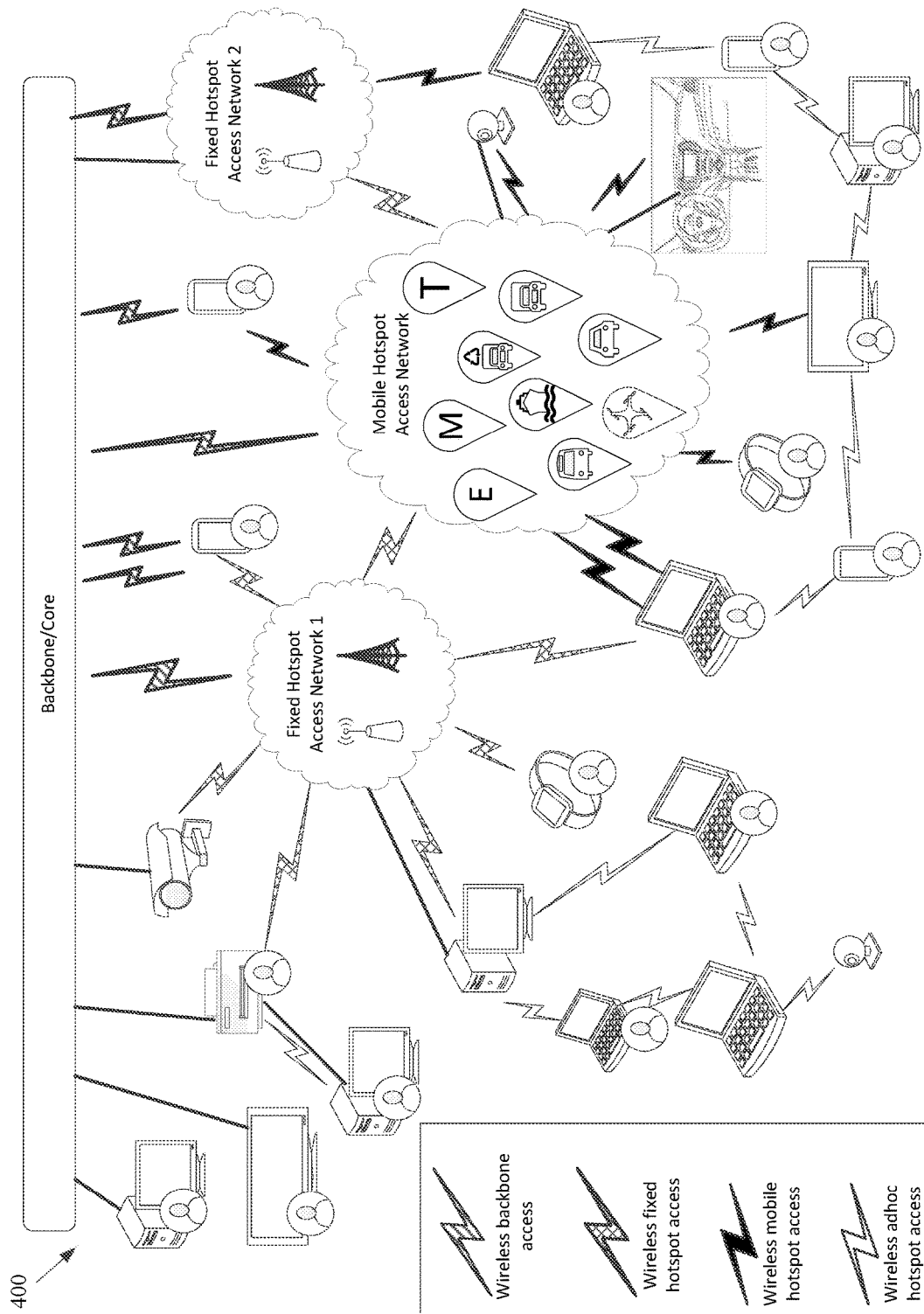
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, 600, 700, 800, 900, and 1000, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
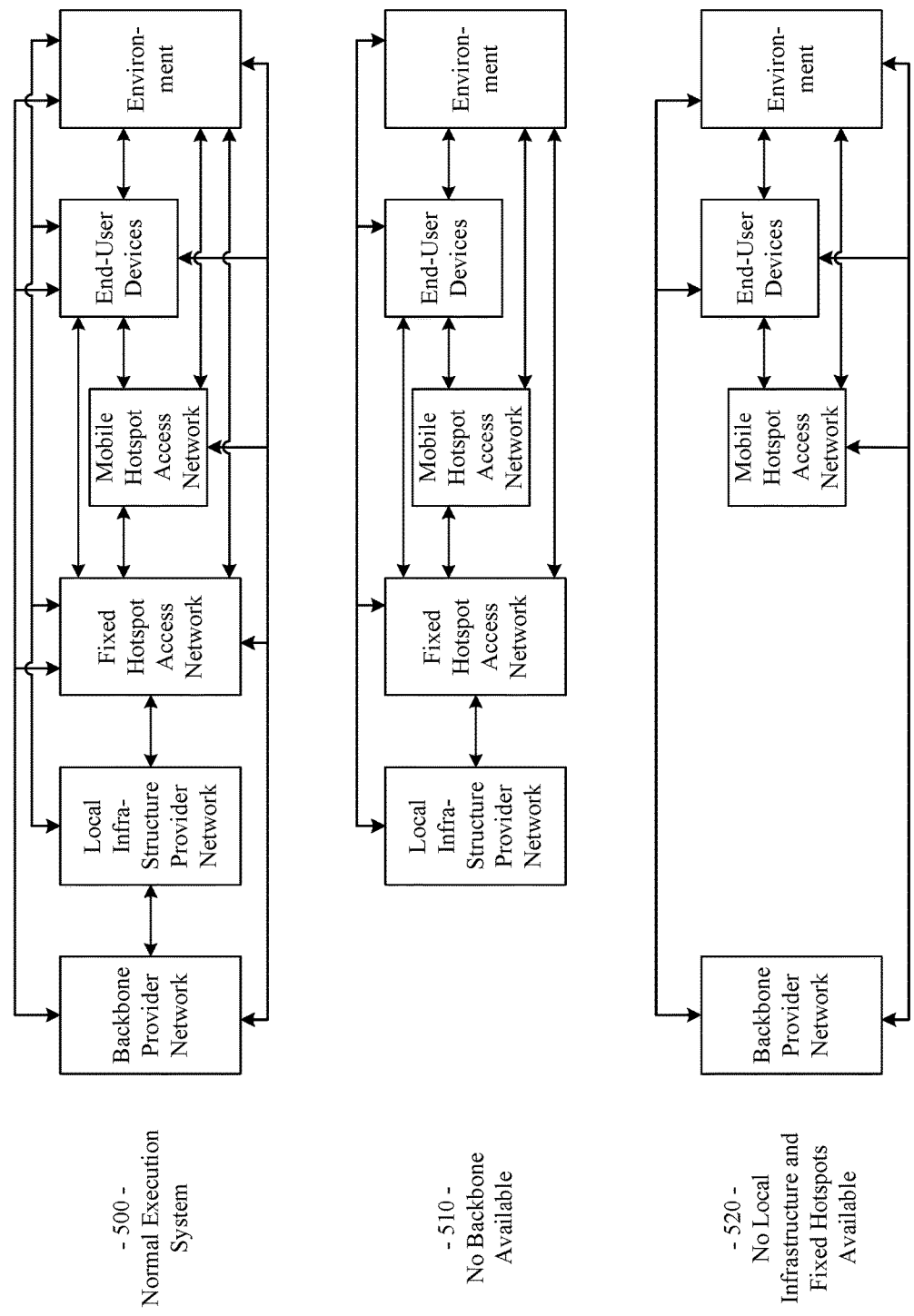
FIGS. 5A-5C show a plurality of network configurations illustrating the flexibility and/or and resiliency of a communication network, in accordance with various aspects of this disclosure.
Figure 5B:
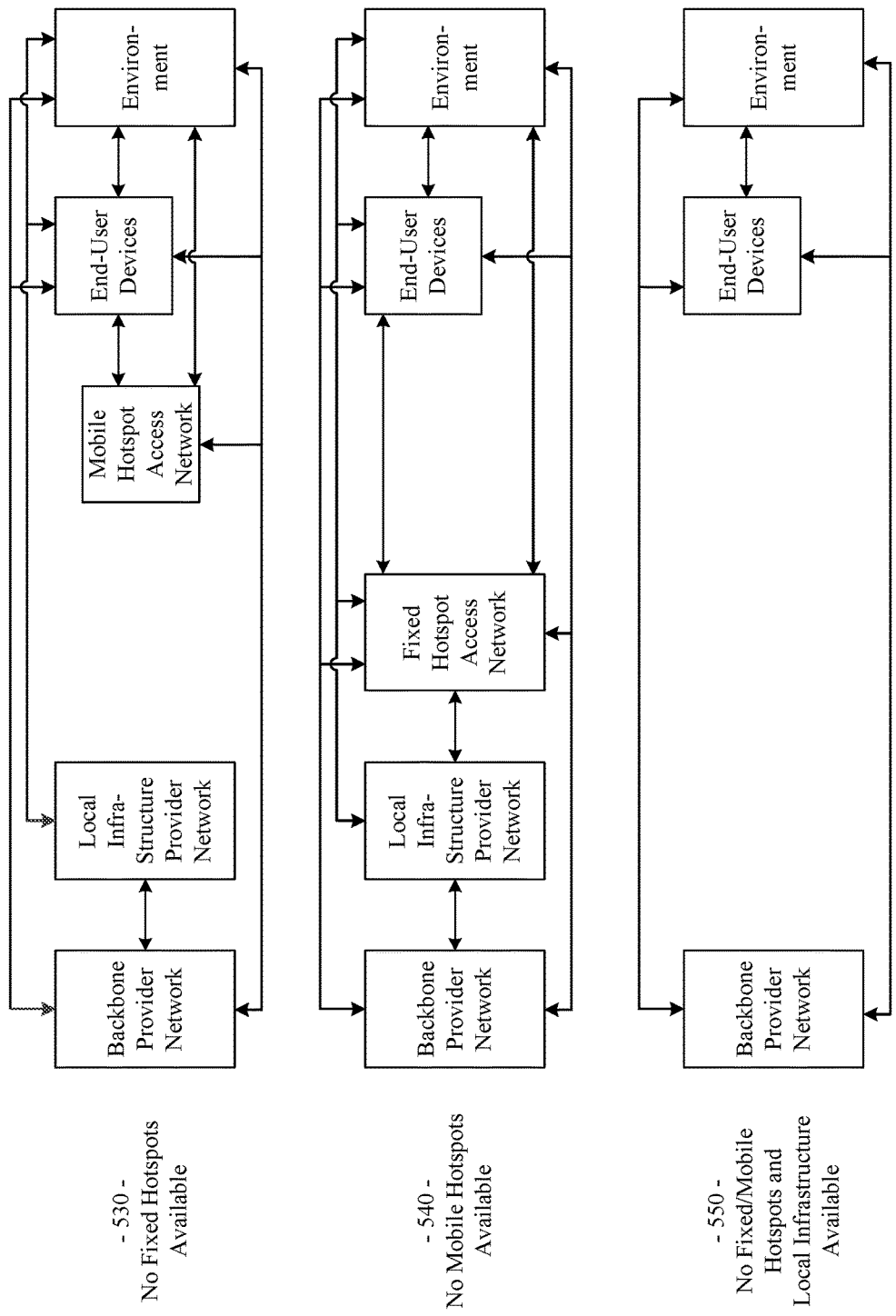
Figure 5C:
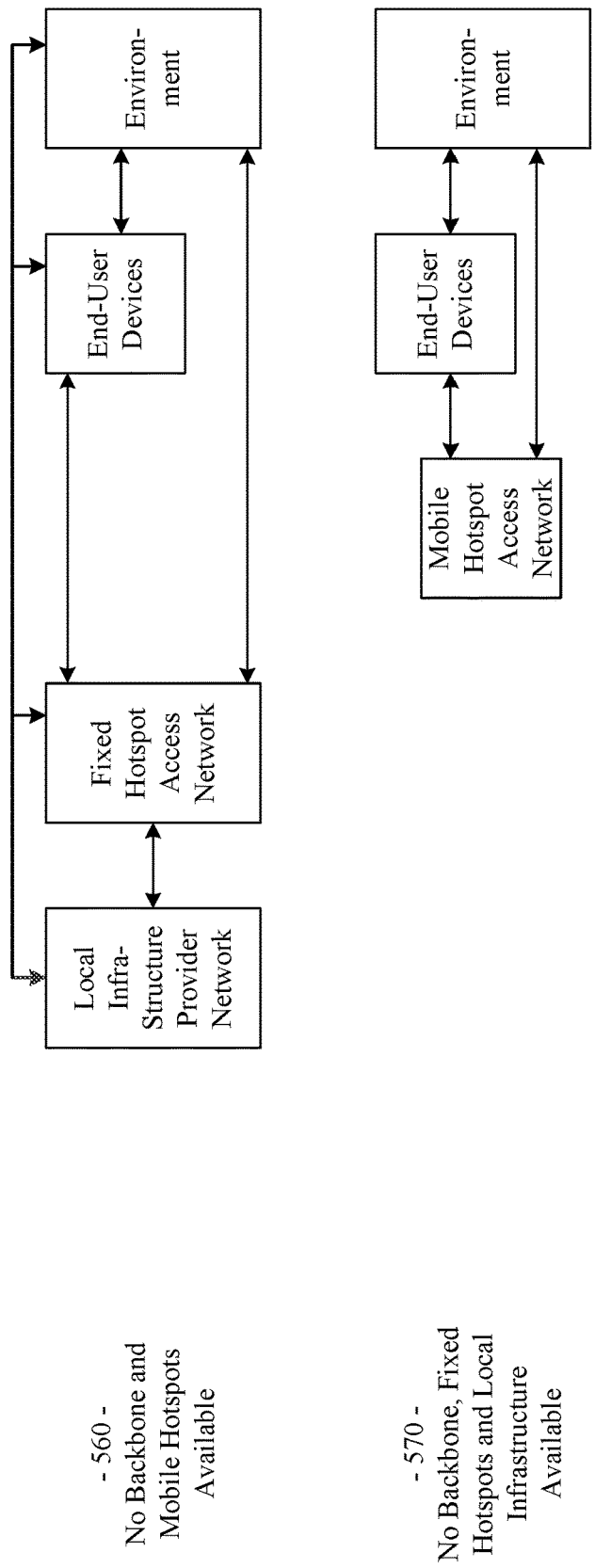

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, 600, 700, 800, 900, and 1000, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
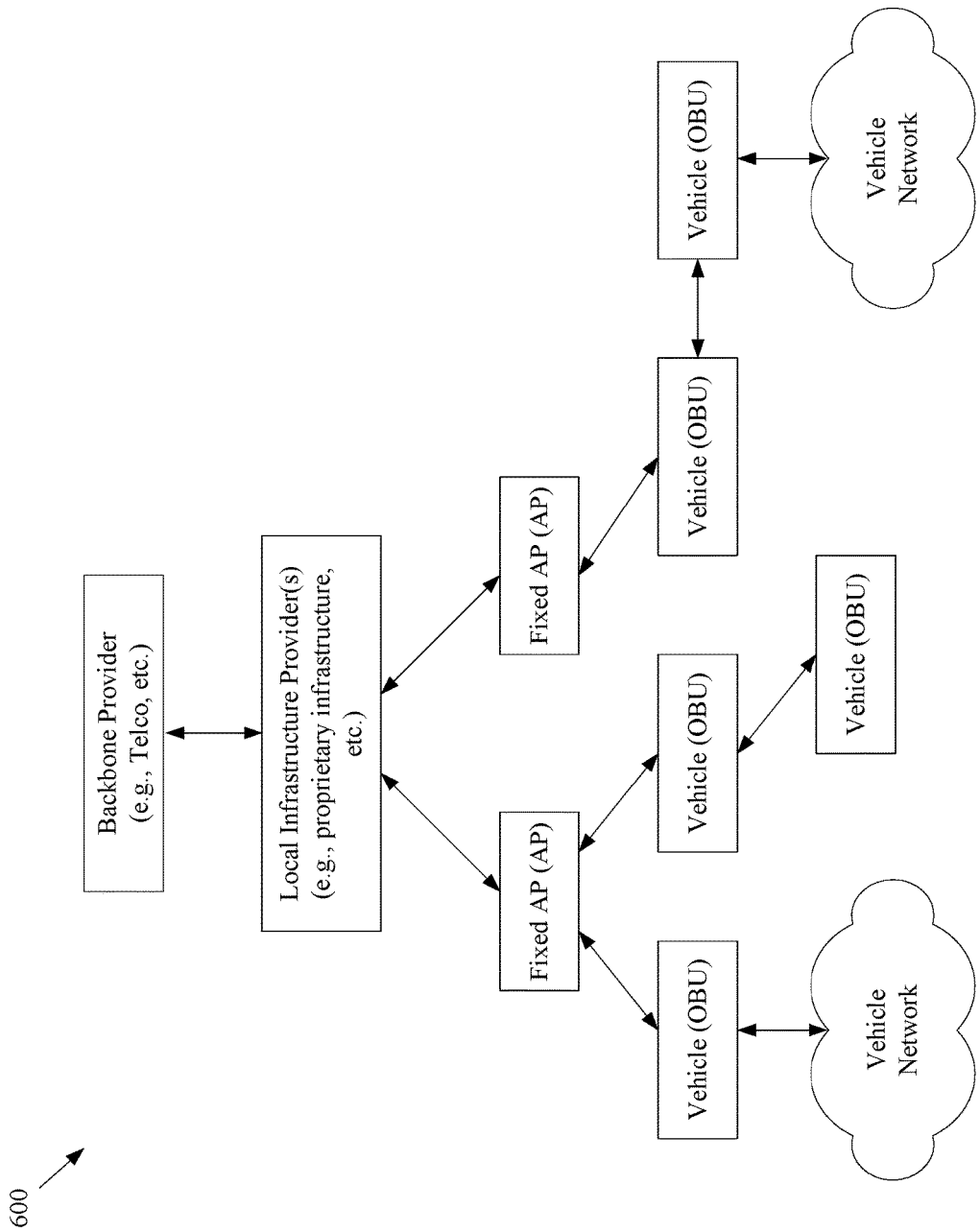
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, 500-570, 700, 800, 900, and 1000, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

Various aspects of this disclosure provide communication network architectures, systems and methods for supporting a network of mobile and/or static nodes. As a non-limiting example, various aspects of this disclosure provide communication network architectures, systems, and methods for providing dynamic routing and/or selection of communication pathways in a communication network comprising a complex array of both static and moving communication nodes (e.g., the Internet of moving things).

Various aspects of the present disclosure provide a self-healing and distributed routing functionality that can be present on every node belonging to each network (e.g., Cloud Network(s), Backbone/Core Network(s), Fixed AP (or Fixed Access) Network(s), Mobile AP (or Mobile Access) Network(s), User (or End-User Devices) Network (s), Sensor Network(s), etc.) that is part of the Network of Moving Things. Such routing functionality may, for example, be driven by any of a variety of models (e.g., a traffic-based model, network-based model, vehicular/mobility-based model, QoS-based model, client-based model, any combination thereof, etc.) and/or complex functions.

As discussed herein a communication system may comprise a set of any of a variety of different networks (or portions thereof) that support the Network of Moving Things. Many non-limiting example characteristics of such networks (or portions thereof) are presented herein (e.g., with regard to FIGS. 1-6, etc.).

For example, non-limiting examples and/or characteristics of Cloud Networks are provided herein (e.g., at Cloud of FIG. 1, etc.). A Cloud Network may, for example, comprise any or all of a variety of different types of nodes. For example, a Cloud Network may comprise any or all kinds of virtual/Web machines in which SW services are deployed (e.g., authentication, accounting, monitoring, management, etc.), for example services utilized to control any or all the networks remotely. Also, the Cloud Network may also comprise the data/content storage, analytics, processing, visualization services, etc., utilized by any or all of the applications and services running in any or all of the different types of client devices, servers, sensors and other machines operating in any of a variety of environments. Through the Cloud, third parties may, for example, access such services. Such services may, for example, be agnostic to the type of Cloud provider.

Also for example non-limiting examples and/or characteristics of the Backbone/Core Networks are provided herein (e.g., at Backbone/Core of FIG. 1, at Backbone/Core of FIG. 2, at Backbone/Core of FIG. 3, at Backbone/Core of FIG. 4, at Backbone Provider Network of FIGS. 5A-5C, at Backbone Provider of FIG. 6, etc.). A Backbone/Core Network may, for example, comprise any one or more of a variety of types of wireline networks, fiber networks, a combination of wireless and wireline networks, etc. For example, the Backbone/Core Networks may be architected and/or configured such that optimal network conditions (e.g., highest throughput, lowest latency, highest redundancy, highest availability, etc.) are achieved when connecting to multiple other client networks or subnetworks, which may also be referred to herein as access networks (e.g., Fixed Access (or Fixed AP) networks, Mobile Access (or Mobile AP) networks, etc.), any of a variety of types of User Networks, any of a variety of types of Sensor Networks, etc. Such Backbone/Core Networks may, for example, be specialized (or specifically adapted or configured) to communicate with specific types of client devices or client servers in a variety of environments.

Additionally for example, non-limiting examples and/or characteristics of Fixed AP (or Fixed Access) Networks are provided herein (e.g., at the Fixed Hotspot Access Network of FIG. 1, at the APs of FIG. 2, at the $3^{rd}$ party APs and Proprietary APs of FIG. 3, at the Fixed Hotspot Access Networks of FIG. 4, at the Fixed Hotspot Access Networks of FIGS. 5A-5C, at the Fixed APs of FIG. 6, etc.).

Many example configurations of Fixed AP (or Fixed Access) Networks are presented herein (e.g., at FIG. 2, etc.). A Fixed AP Network may, for example, comprise a variable number RSUs that are in range, not in range, partially in range, etc., of Mobile APs. Each of such RSUs may, for example, be working properly or not working property (e.g., due to hardware and/or software issues, etc.), and may be connected to the Backbone/Core Network through direct communications or via one or more wireless (mesh) links. Those wireless connections can span from single DSRC, multiple DSRC, DSRC+Wi-Fi, Wi-Fi only, proprietary high bandwidth radio, any combination thereof, etc.

Further for example, non-limiting examples and/or characteristics of Mobile AP (or Mobile Access) Networks are provided herein (e.g., at Mobile Hotspot Access Network of FIG. 1, at Mobile Hotspot Access Network of FIG. 2, at any or all of the vehicles of FIG. 3, at Mobile Hotspot Access Network of FIG. 4, at Mobile Hotspot Access Networks of FIGS. 5A-5C, at the Vehicles (or OBUs) of FIG. 6, etc.).

Many example configurations of Mobile AP (or Mobile Access) Networks are presented herein (e.g., at FIG. 3, etc.). A Mobile AP Network may, for example, comprise a variable number vehicles equipped with an on-board unit (OBU). Such vehicles may, for example, be spread around a city and/or may be densely located in some places (e.g., depots, parking spots, downtown area, etc.). Mobile AP Networks (or Mobile APs thereof) may, for example, be directly connected to Fixed APs, user devices, sensors, etc., though direct or multi-hop wireless links utilizing any communication technology available, as well as to the Backbone/Core Network (e.g., via cellular links, etc.). As discussed herein, a Mobile AP Network may comprise one or more fleets of manually operated vehicles, one or more fleets of autonomous vehicles, any combination thereof, etc.

Still further for example, non-limiting examples and/or characteristics of User Networks are provided herein (e.g., at End-User Devices of FIG. 1, at End-user device of FIG. 2, at any or all of the large variety of user devices shown in FIG. 4, at the End-User Devices of FIGS. 5A-5C, in the Vehicle Network of FIG. 6, etc.).

Many example configurations of User Networks (or User-Device Networks) are presented herein (e.g., at FIG. 4, etc.). Any of a variety of different types of mobile devices (e.g., smartphones, tablets, smartwatches, laptops, webcams, etc.) and/or static networked devices (e.g., monitoring panels, CCTV/IP cameras, HDD, smart TVs, printers, etc.) can be connected to distinct Backbone/Core Networks, Fixed AP Networks, Mobile AP Networks, etc., using the same or different wired/wireless technologies. A device can act as an AP to provide simultaneous access to multiple devices/things, which can then form ad hoc networks, interconnecting devices ultimately connected to distinct Backbone/Core, Fixed Access, and/or Mobile Access Networks. Devices may, for example, comprise redundant technologies to access distinct Backbone/Core, Fixed Access, and/or Mobile Access Networks for fault-tolerance and/or load-balancing purposes (e.g., utilizing multiple SIM cards, etc.). A device may, for example, simultaneously access distinct Backbone/Core, Fixed Access, and/or Mobile Access Networks, which may for example belong to a same provider or different respective providers. A device may, for example, provide multiple accesses to another device/thing (e.g., utilizing different channels and/or radios, etc.).

Non-limiting examples and/or characteristics of Sensor Networks are provided herein (e.g., at Environment of FIG. 1, at Environment of FIG. 2, at Environment of FIGS. 5A-5C, as part of the Vehicle Network of FIG. 6, etc.).

Many example configurations of Sensor Networks are presented herein (e.g., at FIG. 3, etc.). Sensor Networks may, for example, be deployed in cities or other urban areas and controlled spaces, be deployed for many environments and purposes, such as automation/in-vehicle systems, port/maritime networks, controlled spaces, survivable networks, military/aircraft/agtech networks, smart cities (e.g., Wi-Fi on-the-move, municipalities, data harvesting, etc.), road management, traffic/lights optimization, waste management, ads management, tunnels/parking management, etc.

Any or all of such networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.) may be overlapped and/or connected to each other simultaneously, such that all modes of operation of a dynamic mesh environment can run in parallel, covering simultaneous (or concurrent) requirements of different users, clients, fleets, types of data, networking functions, etc.

Non-limiting example mesh modes of operation are illustrated in FIGS. 5A-5C, any or all of which may run in parallel.

Within each network, there can be different network elements, which can be connected directly or in a multi-hop/mesh manner to other elements that belong to the same or different networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.). For example, there may be a mesh mode of operation that comprises: [OBU<->n*OBUs<->m*RSUs<->o*Backbone_links<->Cloud], where n, m and o can range from 0 to thousands.

Any of a variety of different types of connections may be formed (or established or triggered, etc.) by (or among) the different elements of each network, examples of which are provided below. Though the examples are characterized for the upstream (or upload) direction, for example traffic coming from the edge to the backbone networks, the various aspects of the present disclosure also apply to the downstream (or download) direction. Example connections may, for example and without limitation, comprise any of a variety of characteristics.

For example, from a point of view (or perspective) of a sensor, such sensor may for example be connected through: Cellular to one or more backend machines or other nodes; Wi-Fi/DSRC to one or more end-user devices, or to one or more Mobile APs passing nearby, or to one or more Fixed APs, etc.; Ethernet to one or more Fixed APs or to one or more Mobile APs (for example, for an on-board sensor, etc.), etc. Also for example, from a point of view (or perspective) of a user device, the user device can be connected through: Cellular to one or more backend machines or other nodes; Wi-Fi/DSRC to one or more Mobile APs passing nearby, or to one or more Fixed APs, or to one or more end-user devices forming an ad-hoc network, etc.; Ethernet to one or more Fixed APs or to one or more Mobile APs (for example, for a laptop computer, etc.), etc.

Additionally for example, from a point of view of a Mobile AP, the Mobile AP can be connected through: Cellular to one or more backend machines or other nodes; Wi-Fi/DSRC to one or more Mobile APs passing nearby, or to one or more Fixed APs, or to one or more end-user devices that make their cellular connection available, etc. Further for example, from a point of view of a Fixed AP, the Fixed AP can be connected through: Cellular to one or more backend machines (for example, if no fixed infrastructure is available); Wi-Fi/DSRC to one or more Fixed APs located nearby; Ethernet to one or more backend machines; etc.

Still further for example, from a point of view of a backend machine (or other node), the backend machine can be connected through: Ethernet to one or more Cloud machines (or other nodes), or to one or more backend machines (or other nodes); Cellular to one or more backend machines (or other nodes) (for example, if no fixed infrastructure is available); etc. Also for example, from a point of view of a Cloud machine (or other node), it can be connected through: Ethernet to one or more Cloud machines (or other nodes), or to one or more backend machines (or other nodes); etc.

The communication flows/paths that are built on top of each mode of operation can be optimized in design and implementation for different scenarios and purposes, from different networking functions (e.g., session control, security, path control, service control, load control, etc.), which may have different respective goals based on the purpose of each networking function (e.g., very high capacity, lowest cost, certain levels of features regarding resiliency, self-healing capability, fault-tolerance, robustness, availability, security, etc.). To this end, various aspects of the present disclosure provide for nodes to detect, gather, and share the context information that will allow them to select the best link/path to perform any kind (or a particular kind) of networking function.

In this discussion, various aspects of the context that can influence the decision are described, along with the global optimization of the communication paths, as well as the policies/metrics that can influence the path optimization.

From a point of view of an element (or node or device) that is part of each network belonging to the overall communication system, a set of attributes may be used to characterize its networking features, behavior, characteristics, etc., as well as the links that it can establish with accessible or nearby elements from the same or other networks (e.g., Cloud Network(s), Backbone/Core Network(s), Fixed AP (or Fixed Access) Network(s), Mobile AP (or Mobile Access) Network(s), User (or End-User Device) Network(s), Sensor Network(s), etc.).

From a point of view of an element (or node or device) from any type of network, the element (or node or device) can have available different technologies (e.g., communication technologies, etc.) to directly reach different elements (or nodes or devices) on the same or other networks. Also, the element (or node or device) can be surrounded by a variable number of elements (or nodes or devices) of the same network or other networks. The reachable elements may, for example, be described by any of a variety of attributes, non-limiting examples of which are provided herein.

For example, such attributes may comprise network-dependent features, for example, local network attributes (e.g., per technology available to reach another element from a different network, such as Cloud, Backbone, Fixed Access, Mobile Access, End-User Devices, Sensors, etc.), technology (DSRC, multiple DSRC, DSRC+WiFi, Wi-Fi only, Proprietary high bandwidth radio, LTE, 3.5 GHz, TV whitespace, a combination of any or all of these, etc.), completely/partial/not in range, etc. Such network-dependent features may also, for example, comprise storage attributes, for example, available memory, status of the queues, etc. Such network-dependent features may additionally, for example, comprise computation attributes, for example processing capabilities, etc. Such network-dependent features may further for example, comprise channel attributes, for example signal strength/quality, available channels and/or types of channels, expected interference and/or error rate per channel, bandwidth available and/or expected to be available, etc. Such network-dependent features may also, for example, comprise status, for example not working because of hardware problems, not working because of software problems, not working because of power supply problems, etc. Note that the network-dependent features may, for example, comprise networking features that generally independent (or directly independent) of node movement or mobility.

Also for example, such attributes may comprise vehicle/mobility-dependent features/events/behavior that may influence routing decisions. Such vehicle-dependent features may, for example, comprise: expected contact time (e.g., derived from position, velocity, speed, travel plan, historical travel, wireless medium quality, etc.), for example amount of expected contact time, when expected contact window will open/close, etc. Such vehicle-dependent features may also, for example, comprise vehicle type (e.g., public transportation vehicle, municipal service vehicle, private enterprise vehicle, private individual vehicle, road/rail/water/air vehicle, etc.). For example, particular types of vehicles may be associated with respective levels of service. For example, a heavy vehicle may generally correspond to a relatively more noisy wireless communication environment, while a light vehicle may generally correspond to a relatively less noisy wireless environment, which may thus weight a routing decision toward a light vehicle. Additionally for example, a public bus may be associated with relatively high bandwidth available for public communication, while a private waste management company vehicle may be associated with relatively low bandwidth available for public communication.

Additionally for example, such vehicle-dependent features may comprise current and/or predicted density of neighboring nodes (e.g., vehicles or Mobile APs, Fixed APs, sensors, etc.). For example, a node operating (or predicted in the near future to be operating) in an area of high access point density may be susceptible to relatively more interference from neighboring nodes than a node operating in an area with less access point density. Also, however, depending on the node's needs (e.g., a node desiring low-bandwidth high-reliability communication), relatively high access point density may provide for higher diversity of communication pathways (or mesh options) that may be used for failover communication. Further for example, such vehicle-dependent features may comprise expected downtimes. Such expected downtimes may, for example, include an overall percentage of time that nodes are operating or not. Such expected downtimes may also, for example, comprise absolute times at which nodes (or paths) are generally expected to be down or operating (e.g., dead zone operation, tunnel operation, high-noise environment operation, etc.).

Further for example, such vehicle-dependent features may comprise expected crowd (or crowded) places. For example, it may generally be advantageous to select a node (or communication path) that does not operate (or expect to operate) in a geographical area that is (or is anticipated to be) crowded. For example, a crowded area may place high demands on limited communication bandwidth. Also for example, such vehicle-dependent features may comprise in-range status or a degree to which a node is in-range (e.g., completely in-range, partially in-range, not in-range, etc.), current and/or predicted. For example, predicted in-range status may be related to expected contact time, as mentioned above. Also for example, present in-range status may be determinative when a short communication is to be performed. Partially in-range status may, however, be adequate for a short communication but may be increasingly disfavored for a longer communication. Still further for example, such vehicle-dependent feature may comprise a node in (or predicted to be in) zones with difficult access (e.g., derived from position or movement information, mapping information, historical performance information, etc.).

Figure 7:
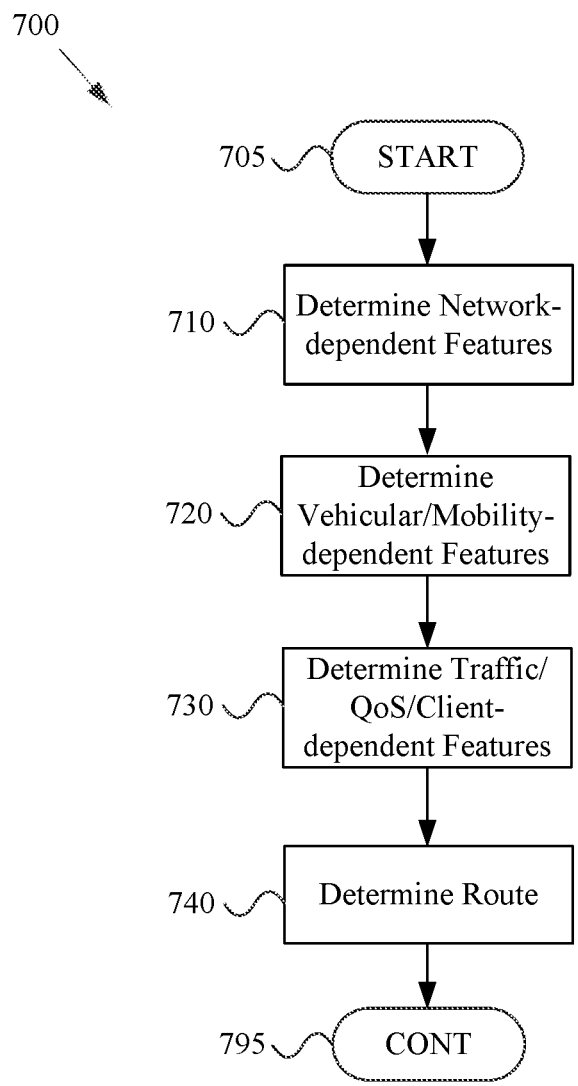
FIG. 7 shows an example method of communication path selection, in accordance with various aspects of the present disclosure.

FIG. 7 shows an example method of communication path selection, in accordance with various aspects of the present disclosure.

For example, any or all of the blocks (or steps) of the example method 700 may be performed by any one or more of the network components presented herein (e.g., a Mobile AP, Mobile AP and external IC, Mobile AP and Cloud server, etc.).

The example method 700 may, for example, begin executing at block 705. The example method 700 may begin executing in response to any or a variety of causes or conditions. For example, the example method 700 may continually and/or periodically run. The example 700 may begin in response to a request for a communication. Also for example, block 705 (or any block of the example method 700) may receive execution flow from any example method discussed herein (e.g., from the example method 900 or any block thereof or any portion of any block thereof, etc.). Additionally for example, block 705 may comprise receiving execution flow from any other block of the example method 700 or any portion thereof.

At blocks 710 and 720, information of the relevant network-dependent features (many examples of which are provided herein) and vehicular/mobility-dependent Features (many examples of which are provided herein) is obtained (or determined). Such information may be obtained (e.g., by a node of the communication system) in any of a variety of manners. For example, such information may be shared among neighboring nodes and/or may be advertised by the Cloud, Fixed APs, Mobile APs, etc. Such information may also, for example, be stored in a central database and made available to a node of the communication system by request (e.g., through APIs, etc.). In an example implementation, such information may be obtained from autonomous vehicles (or MAPs thereof, control systems, thereof, etc.) and/or a central control system thereof. Such information may, for example be shared network-wide, but may also be shared in a segmented manner. For example, a Mobile AP that never operates within range (e.g., within a particular number of hops) of a particular Fixed AP might not maintain (or seek) information related to the particular AP. Selective propagation of such information may thus be implemented (e.g., to save communication bandwidth). Additionally for example, a first portion of such information may be propagated among the nodes, while a second portion of such information is made available via the cloud.

As discussed herein, the propagation of such information may be based on a push system, a pull system, or a combination thereof. In an example scenario, a first node might communicate information relative to its vehicle context, network operational status, etc. whenever a present state deviates from a last reported state by a particular percentage. For example, a node that experiences a reduction (or increase) in bandwidth by 10% from a previously propagated value may propagate its information. Also for example, a node that determines (e.g., through historical pattern analysis, through analysis of present conditions, etc.) that it is going to be operating in a dead zone or challenging communication environment within a particular amount of time may determine to propagate updated information of its status. Similarly, a node that determines (e.g., through historical pattern analysis, through analysis of present conditions, etc.) that it is entering a period of reliable availability may propagate its information of its status. Such communication may also take place periodically at a set time (or period). In such a way, such communication may be coordinated between the various nodes of the network in a controlled-bandwidth manner.

This information may, for example, be considered when a node belonging to any network needs to reach another node that belongs to another network for any kind of purpose or reason (e.g., due to security, session control, data transport, etc.). For example, in various example scenarios, there may be multiple (or many) links/paths through which a specific node can reach another node. In such example scenarios, each node may select the best link/path to reach the other node, and the node may for example perform the selection based at least in part on the network-dependent and vehicular/mobility-dependent characteristics. In the example method 700 of FIG. 7, route determination may be made at block 740. As discussed herein, the determination may be made autonomously by individual nodes (e.g., Mobile APs, Fixed APs, etc.), a combination of nodes (e.g., a combination of Mobile APs and/or Fixed APs), a central controller, and/or a combination thereof.

The Network of Moving Things supports many different types of sessions and/or functions. Routing decisions may also, for example, be based at least in part on the intrinsic data traffic-dependent (e.g., general payload data, control-independent data, etc.) and/or control traffic-dependent features as well as, for example, the QoS needs of the different respective control and/or data packets (or streams, connections, etc.) belonging to different networking functions (e.g., functions related to session control, security, path control, service control, load control, etc.). Such features may, for example, be determined at block 730 and may be considered in the route determination made at block 740. Non-limiting examples of such features are provided herein.

For example, traffic-dependent features associated with general data may, for example, comprise: whether the data is communicated in a deterministic or burst or periodic manner, whether the data is real-time immediate, real-time but latency-tolerant within some limit, generally delay-tolerant, etc. Also for example, traffic-dependent features associated with general data may comprise static features, for example: origin/destination of data (sensor, user, MAP, FAP, Cloud, Backend, etc.), maximum payload, periodicity, etc. Additionally for example, traffic-dependent features associated with general data may comprise dynamic features, for example: granularity or resolution of data, data rate, rate of requests, etc.

Also for example, traffic-dependent features associated with control may comprise: expected control overhead, rate of signaling, number of retries, time-out, type of protocol, IPs/VLANs/ports available, number of coexisting sessions, certificates required, authentication needed, etc.

QoS-dependent (Quality-of-Service-dependent) features may, for example, comprise: latency requirements, throughput requirements, allowed probability of failure (if failure can be admitted (or accepted), etc. Client-dependent features may, for example, comprise permissions to access the different machines/databases/federations, data classes originating from users or user-devices or sensors, user-preferences regarding cost, mobile operator, Cloud provider, etc.

Such information may, for example, be known to the node making the routing decision. Such information may also, for example, be received from another node (e.g., in an unsolicited manner, upon request, etc.). In the example method 700 shown in FIG. 7, such information may, for example, be determined at block 730.

As discussed herein, the routing decision (e.g., at made at block 740) for a node may be based, at least in part, on any or any combination of the features discussed herein (e.g., network-dependent features (determined at block 710), vehicular/mobility-dependent features (determined at block 720, traffic-dependent features (determined at block 730), QoS-dependent features (determined at block 730), client-dependent features (determined at block 730), etc.). As discussed herein, the routing decision may be based on a single highest-priority feature, may be based on a decision-tree with nodes based on one or more respective features, may be based on a weighted cost (or quality) function in which various features are weighted based on importance, etc. In the example method 700 shown in FIG. 7, the routing decision may, for example, be made at block 740. Such a decision may, for example, be based, at least in part, on a comparison between the respective features corresponding to each of a plurality of communication paths (or corresponding nodes) that are available for a communication.

Various aspects of the present disclosure also comprise characterizing each link/path (or mesh configuration) using policies (or networking functions) that are relevant for the Network of Moving Things. For example, a Path Score may be calculated:

$$\text{Path Score} = \sum_i (w_i * \text{Feature}_i)$$

where the parameter Feature, may, for example, be any or all of the Network, Vehicular/Mobility, Traffic, QoS, and/or Client Features presented herein; and the parameter $w_i$ is a corresponding weight applied to each respective Feature in the Path Score summation. In an example implementation, the parameter $w_i$ may, for example, be a value from 0 to 1, and the sum of all $w_i$ parameters may equal 1.

The characterization (e.g., calculation, etc.) may be based on information (or feedback) received by local nodes related to, among other things, any of the features discussed herein (e.g., Network-dependent features, Vehicular/Mobility-dependent features, Traffic-dependent features, QoS-dependent features, Client-dependent features, etc.).

Figure 8:
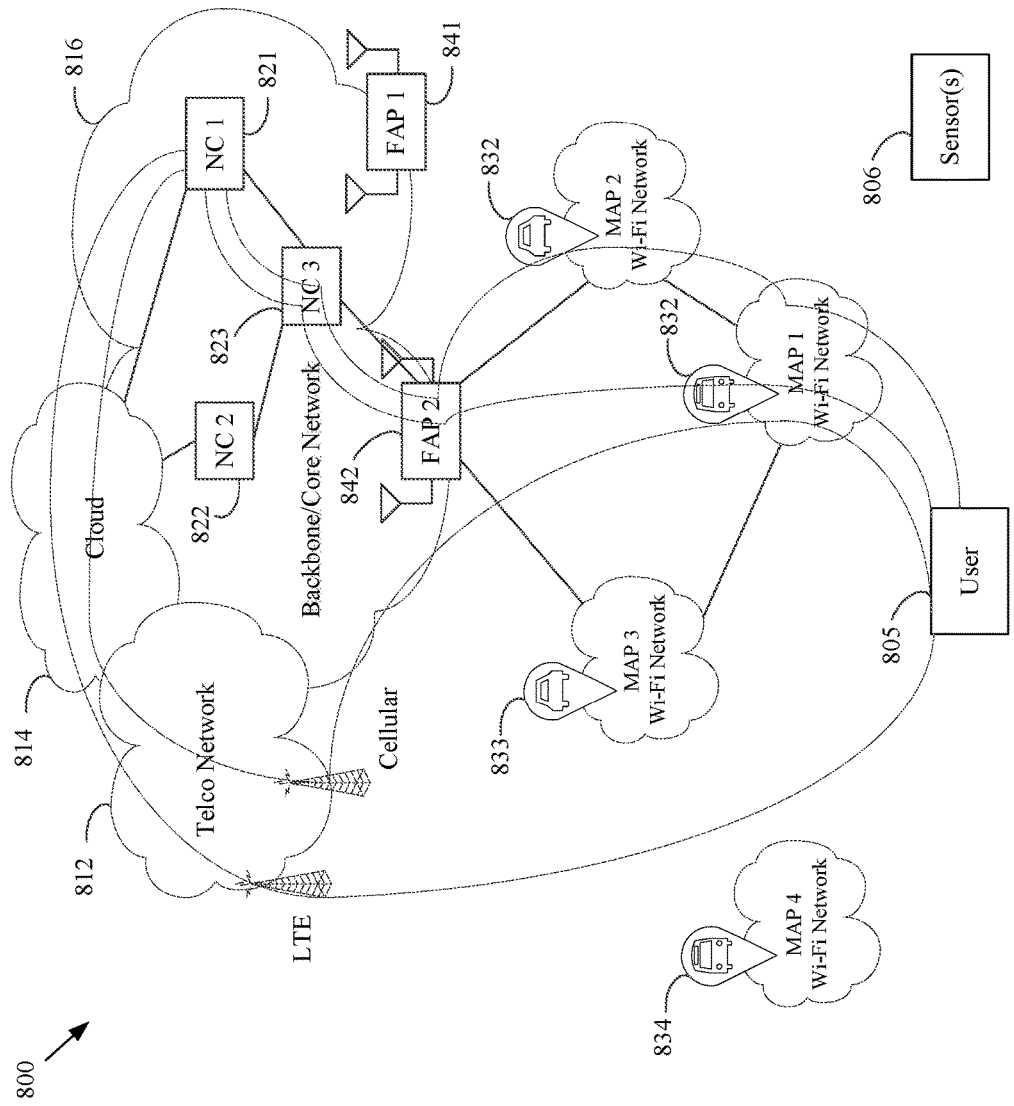
FIG. 8 shows an example communication path selection scenario, in accordance with various aspects of the present disclosure.

As discussed herein, a communication may be performed over any of a variety of different communication pathways (or nodes), each with their own respective features (or characteristics). As a non-limiting example, FIG. 8 shows an example communication path selection scenario, in accordance with various aspects of the present disclosure. The example User 805 (or Sensor 806, which may for example have any of the same connectivity as the example User 805) (e.g., an electronic device thereof) may, for example, communicate with the first Network Controller (NC) 821 through LTE and the telco network 812, the Cloud 821, and the Backbone/Core Network 814. The example User 805 may also, for example, be able to communicate with the first Network Controller (NC) 821 through a first Mobile Access Point (MAP) 831 and a number of different pathways between the first Mobile Access Point 831 and the first Network Controller 821 (e.g., through the first MAP 831, through cellular and the telco network 812, the Cloud 814, and the Backbone/Core Network 816; through the first MAP 831, the second FAP 842, and the third NC 823; through the first MAP 831, the second MAP 832, second FAP, and third NC; etc.). Each of such paths, for example in its entirety and/or by each individual link, may be assigned a path score.

Each node may, for example, derive/calculate the path score corresponding to each of the available different links/paths to reach a specific destination (e.g., for a particular communication and/or in general), which will correspond to a particular mesh configuration that includes nodes from different networks (e.g., Cloud, Backbone, Fixed Access, Mobile Access, End-User Devices, Sensors, etc.). The score of each link/path to reach a specific destination, S, may for example be represented as a weighted sum of metrics (or features) like represented in the equation above. A best link/path (or mesh configuration) may then, for example, be selected. Note that such selection may be performed for each session, for example based at least in part on different triggers and/or policies, which are based on different session purposes.

In an example implementation, the score, S, may be represented as a level between 0 and 1. That specific score may be formed and/or translated differently according to the type of networking function (e.g., session control, security, path control, service control, load control, etc.) that needs a route to reach a particular destination. Non-limiting examples of such networking functions and respective features (or aspects or characteristics) thereof are provided below. Note that some features may be generic (e.g., used by all or most network functions) and some features may be specifically tailored to a specific networking function. For example, such overall features may comprise: overall latency/throughput until the final destination; probability of reaching a destination; expected availability of the path (based on expected events/contact time), etc.

For a path control networking function, such networking function-specific features may, for example comprise: number of hops, number of networks (Cloud, Backbone, Fixed Access, Mobile Access, End-User Devices, Sensors) that belong to each path; characterization of the path until the destination (e.g., whether it uses cellular or Wi-Fi or DSRC, as some apps can be blocked there, etc.); level of redundancy/availability achieved (e.g., determined by the minimum of interfaces/radios available on each node belonging to each path, etc.), ratio between fixed and mobile nodes along the path; etc. Also, for a session control networking function, such networking function-specific features may, for example, comprise: load (based on the number of coexisting sessions over that path); expected number of handovers that could affect the session performance; expected changes of IP; size of routing tables of the nodes belonging to that path; etc.

Additionally for example, for a service control networking function, such networking function-specific features may comprise: number of service brokers/controllers/advertisers along the path; locality of the path with respect to the nodes providing the service content; number of users using that service along that path; bandwidth available to that service; overall user QoE feedback over the entire path; etc. Further for example, for a load control networking function, such networking function-specific features may comprise expected level of packets discarded/queued along the path; maximum bottleneck in terms of queue/buffering/memory; etc. Still further for example, for a security networking function, such networking function-specific features may comprise: type of tunnels; permissions; authentication required on the overall path; required certificates; expected level of trusting on the nodes that belong to a specific path; etc.

Note that any or all of the Networking Function features may be utilized for path selection in a variety of manners. For example, the Network Function features may be utilized to analyze a path score that was formed based on the previously-discussed features (e.g., the Network-dependent features, the Vehicular/Mobility-dependent features, the Traffic/QoS/Client-dependent features, etc.). Also for example, the Network Function and/or Network Function features may affect the calculation of the path score (e.g., affecting which of the features are included in the path score determination, affecting weighting factors of the path score determination, etc.).

For example, a first of the network functions (e.g., Session Control, etc.) may include expected control overhead with a respective weight in its path cost calculation, while a second of the network functions (e.g., Security, etc.) may include expected control overhead with a different respective weight (or not include expected control overhead at all) in its path cost calculation. In another example, a first of the network functions (e.g., Service Control, etc.) may include maximum payload with a lower limit and a respective weight in its path cost calculation, while a second of the network functions (e.g., Load Control, etc.) may include maximum payload with a different respective weight in its path cost calculation.

Note that for various network functions (or for path selection in general), the features here may also correspond to absolute requirements. The path cost may, for example, be calculated or not based on whether absolute requirements are met. For example, in an example scenario in which the Security function dictates that minimum level of security functionality is absolutely necessary, the path cost need not be calculated for a path that does not provide the necessary level of security functionality end-to-end. Also for example, in an example scenario in which a minimum level of communication bandwidth is absolutely necessary, the path cost for a path need not be calculated if a path is not capable of meeting the minimum level of communication bandwidth.

Figure 9:
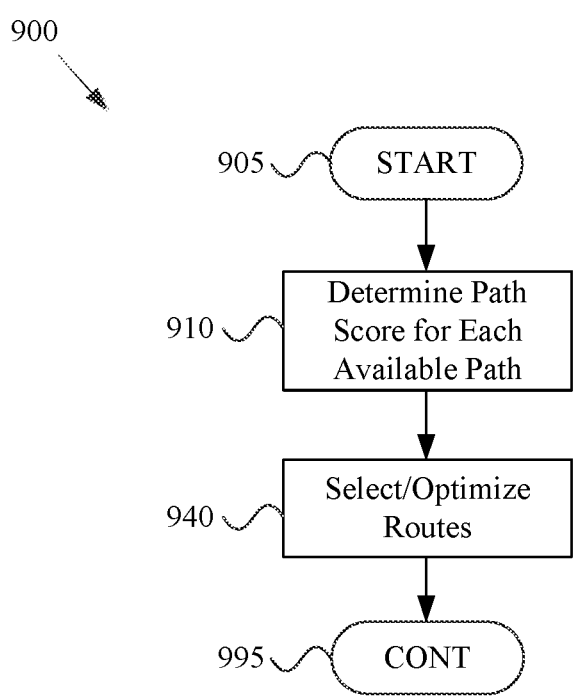
FIG. 9 shows an example method of communication path selection, in accordance with various aspects of the present disclosure.

FIG. 9 shows an example communication path selection scenario, in accordance with various aspects of the present disclosure. The example method 900 may, for example, share any or all characteristics with the other example methods, systems, networks and/or network components 100, 200, 300, 400, 500-570, 600, 700, 800, and 1000, discussed herein. For example, any or all of the blocks (or steps) of the example method 800 may be performed by any one or more of the network components presented herein (e.g., a Mobile AP, Mobile AP and external IC, Mobile AP and Cloud server, etc.).

The example method 900 may, for example, begin executing at block 905. The example method 900 may begin executing in response to any or a variety of causes or conditions. For example, the example method 900 may continually and/or periodically run. The example 900 may begin in response to a request for a communication. Also for example, block 905 (or any block of the example method 900) may receive execution flow from any example method discussed herein (e.g., from the example method 700 or any block thereof or any portion of any block thereof, etc.). Additionally for example, block 905 may comprise receiving execution flow from any other block of the example method 900 or any portion thereof.

Block 910 may, for example, utilize the features utilized in, and discussed with regard to, the example method 700 of FIG. 7. Block 910 may, for example, share any or all characteristics with any or all blocks of the example method 700 (e.g., blocks 710-730, path determination aspects of block 740, etc.). As explained above, any or all of the features utilized in the example method 700 of FIG. 7 may be selected and/or considered (e.g., logically considered, weighted, etc.) based on the particular networking function being considered. In other words, the score of each path may be linked with features intrinsically related with the purpose of the networking function for which the path is required. For example, the same path may have different path scores for different respective networking functions performed on top of the path. Block 940 may, for example, comprise selecting and/or optimizing communication routes. Block 940 may, for example, share any or all characteristics with block 740 of the example method 700 (e.g., the path selection aspects thereof, etc.).

Figure 10:
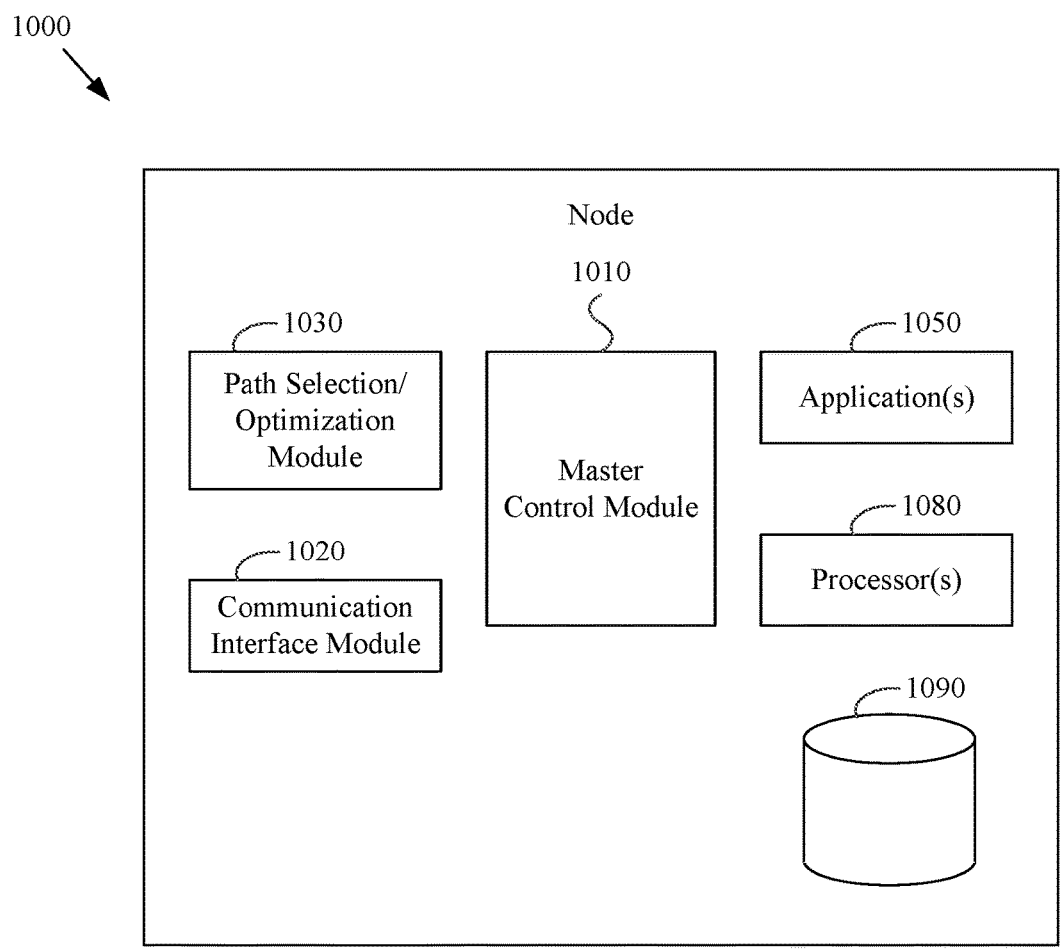
FIG. 10 shows an example method of communication path selection, in accordance with various aspects of the present disclosure.

FIG. 10 shows a block diagram of an example network node (e.g., a MAP, a FAP, an NC, a Central Network Controller, a Cloud server or computing system, etc.), in accordance with various aspects of the present disclosure.

The example node 1000 may, for example, share any or all characteristics with the other example methods, systems, networks and/or network components 100, 200, 300, 400, 500-570, 600, 700, 800, and 900, discussed herein. For example, any or all of the components of the example node 1000 may perform any or all of the method steps presented herein, for example with regard to a Mobile AP, a Central Network Controller, etc.

The example node 1000 may, for example, comprise a Communication Interface Module 1020 that operates to perform any or all of the wireless and/or wired communication functionality for the node 1000, many examples of which are provided herein (e.g., communication with communication with Cloud databases, communication with NCs, communication with Fixed AP nodes, communication with Mobile AP nodes, communication directly with client devices, backhaul or cellular communication, etc.). The Communication I/F Module 1020 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc.

The example node 1000 also comprises a Path Selection/Optimization Module 1030 that, for example, operates to perform any or all of the path selection and/or optimization functionality (e.g., feature information generation or communication, path decision making, path cost determining, etc.) discussed herein (e.g., with regard to the example methods 700 and 900 of FIGS. 7 and 9, etc.). The Path Selection/Optimization Module 1030 may, for example, utilize communication services provided by the Communication Interface Module 1020 to perform various aspects of communication.

The example node 1000 may, for example, comprise a Master Control Module 1010 that generally manages operation of the node 1000 at a high level. Such Master Control Module 1010 may, for example, comprise various aspects of an operating system for the node 1000.

The example node 1000 may further, for example, comprise one or more Applications 1050 executing on the node 1000 (e.g., shipping control applications, sensor interface applications, client management applications, security applications, power management applications, vehicle monitoring applications, location services applications, user interface applications, etc.).

The example node 1000 may also comprise one or more Processors 1080 and Memory Devices 1090. The Processor(s) 1080 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1090 may, for example comprise any of a variety of memory characteristics. For example, the Memory Device(s) 1090 may comprise a volatile memory, non-volatile memory, etc. The Memory Device(s) 1090 may, for example, comprise a non-transitory computer-readable medium that comprises software instructions that when executed by the Processor(s) 1080, cause the node 1000 to perform any or all of the functionality discussed herein (e.g., shipping control functionality, sensor interface functionality, mobility management functionality, communication functionality, etc.).

In general, as provided herein, the context information/knowledge that can affect the routing decision may be sensed, acquired, and/or gathered by every node of each network (Cloud, Backbone, Fixed Access, Mobile Access, End-User Devices, Sensors, etc.), and/or can be requested/advertised by the different reachable networks/nodes (e.g., Cloud, FAPs, etc.) through the different sensors/interfaces/technologies (3G, 3.5G, 4G, TV whitespace, Wi-Fi, DSRC, Bluetooth, Ethernet, etc.).

After gathering all the knowledge that can affect the path calculation, the path optimizations to derive the score of making use of a specific path/route/connection to reach a specific network/node can be computed and managed centrally and/or can be optimally computed and shared in a peer-to-peer and distributed fashion such that no centralized (global) network or parameter knowledge is required.

Even when the path optimization is performed centrally (e.g., determination of the score of using each path, etc.), the final decision of using a pre-defined/pre-selected route/path, or to change to another route/path, can be performed locally by the node itself after being advised by the central entity. For example, threshold-based decisions can be performed in every node to decide if it should keep using the current path/connection or it should start using a new path (e.g., a new advertised path).

Each node is able to gather and share different features characterizing the network, the vehicular environment, the client, the user and the traffic, being then able to calculate and determine a score assigned to a path when selected for a specific networking function, either transport, session control, security purposes, balance load, etc. The score of each path may, for example, be linked with features intrinsically related with the purpose of the networking function for which the path is required (e.g., the same path can have different scores for the different networking functions performed on top of it).

In summary, various aspects of this disclosure provide communication network architectures, systems and methods for supporting a network of mobile and/or static nodes. As a non-limiting example, various aspects of this disclosure provide communication network architectures, systems, and methods for providing dynamic routing and/or selection of communication pathways in a communication network comprising a complex array of both static and moving communication nodes (e.g., the Internet of moving things), for example including a network of autonomous vehicles. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A mobile access point (MAP) of a vehicle communication network, the MAP comprising:
at least one module operable to, at least:
for each of a plurality of reachable mobile nodes, determine at least one vehicle-dependent feature;
determine at least one traffic-dependent feature; and
determine a path score for each of a plurality of communication paths to a destination for a communication, based at least in part on the at least one vehicle-dependent feature and on the at least one traffic-dependent feature, wherein the at least one vehicle-dependent feature comprises a type of vehicle carrying said each of the plurality of reachable mobile nodes, and
wherein a public type of vehicle results in a better path score than a private type of vehicle; and
select a route for the communication based, at least in part, on the determined path scores,
wherein the path score is based on a weighted equation in which each of said at least one vehicle-dependent feature has a respective adaptable weight.

2. The mobile access point (MAP) of claim 1, wherein the at least one vehicle-dependent feature comprises:
expected travel route of said each of the plurality of reachable mobile nodes;
an expected down time of said each of the plurality of reachable mobile nodes;
an expected time of high utilization of said each of the plurality of reachable mobile nodes; and/or
a degree to which said each of the plurality of reachable mobile nodes is presently in-range.

3. The mobile access point (MAP) of claim 1, wherein the at least one module is operable to determine the respective adaptable weight as a function of an identified networking function.

4. The mobile access point (MAP) of claim 1, wherein the at least one traffic-dependent feature comprises expected control overhead.

5. The mobile access point (MAP) of claim 1, wherein the at least one traffic-dependent feature comprises number of retries.

6. The mobile access point (MAP) of claim 1, wherein the at least one traffic-dependent feature comprises whether data traffic is burst or periodic.

7. The mobile access point (MAP) of claim 1, wherein the at least one traffic-dependent feature comprises latency tolerance.

8. The mobile access point (MAP) of claim 1, wherein the at least one module is operable to determine a QoS-dependent feature, and determine the path score for each of the plurality of communication paths to a destination for a communication based, at least in part, on the QoS-dependent feature.

9. The mobile access point (MAP) of claim 1, wherein the at least one module is operable to determine a client-dependent feature, and determine the path score for each of the plurality of communication paths to a destination for a communication based, at least in part, on the client-dependent feature.

10. A mobile access point (MAP) of a vehicle communication network, the MAP comprising:
at least one module operable to, at least:
for each of a plurality of reachable mobile nodes:
determine at least one vehicle-dependent feature related to mobile node movement;
determine a vehicle type; and
determine at least one network-dependent feature unrelated to mobile node movement;
determine a path score for each of a plurality of communication paths to a destination for a communication, based at least in part on the at least one vehicle-dependent feature, on the vehicle type, and on the at least one network-dependent feature,
wherein a public type of vehicle results in a better path score than a private type of vehicle; and
select a route for the communication based, at least in part, on the determined path scores.

11. The mobile access point (MAP) of claim 10, wherein the at least one vehicle-dependent feature comprises expected travel route of said each of the plurality of reachable mobile nodes.

12. The mobile access point (MAP) of claim 10, wherein the at least one vehicle-dependent feature comprises an expected down time of said each of the plurality of reachable mobile nodes, where the expected down time comprises one or more absolute times at which said each of the plurality of reachable mobile nodes is expected to be non-operative.

13. The mobile access point (MAP) of claim 10, wherein the at least one vehicle-dependent feature comprises an expected time that said each of the plurality of reachable mobile nodes will operate in a crowded area.

14. The mobile access point (MAP) of claim 10, wherein the at least one vehicle-dependent feature comprises a degree to which said each of the plurality of reachable mobile nodes is presently in-range.

15. The mobile access point (MAP) of claim 10, wherein the at least one network-dependent feature comprises other nodes reachable by said each of the plurality of reachable mobile nodes.

16. The mobile access point (MAP) of claim 10, wherein the at least one network-dependent feature comprises communication technology available to said each of the plurality of reachable mobile nodes.

17. The mobile access point (MAP) of claim 10, wherein the at least one network-dependent feature comprises characteristics of channels that are currently available to said each of the plurality of reachable mobile nodes.

18. The mobile access point (MAP) of claim 10, wherein the at least one module is operable to determine the at least one vehicle-dependent feature for said each of the plurality of reachable mobile nodes by receiving information of the at least one vehicle-dependent feature from a central database.

19. The mobile access point (MAP) of claim 10, wherein at least one of said each of the plurality of reachable mobile nodes is a node being carried by an autonomous vehicle.

20. The mobile access point (MAP) of claim 10, wherein the path score is based on a weighted equation in which each of said at least one vehicle-dependent feature has a respective variable weight.

21. The mobile access point (MAP) of claim 10, wherein the at least one module is operable to:
identify a networking function;
identify, based at least in part on the identified networking function, a set of features and respective weights for determining the path score;
determine the path score; and
select the route for the communication based, at least in part, on the determined path score.

22. The mobile access point (MAP) of claim 21, wherein the at least one module is operable to identify the networking function by, at least in part, operating to select the identified networking function from a plurality of predefined networking functions.

23. A mobile access point (MAP) of a vehicle communication network, the MAP comprising:
at least one module operable to, at least:
for each of a plurality of reachable network nodes determine at least one vehicle-dependent feature;
identify a first networking function;
identify, based at least in part on the identified first networking function, a first set of features and respective weights for determining a first path score;

determine the first path score based at least in part on the identified first set of features and respective weights and on the vehicle-dependent feature;

determine a route for a communication based, at least in part, on the path score;

identify a second networking function;

identify, based at least in part on the identified second networking function, a second set of features and respective weights for determining a second path score, wherein the second set of features and respective weights is different from the first set of features and respective weights;

determine the second path score based at least in part on the identified second set of features and respective weights and on the vehicle-dependent feature, wherein the first and second path scores are different for a same path at a same time; and determine a second route for a second communication based, at least in part, on the second path score.

24. The mobile access point (MAP) of claim 23, wherein:
the first and second sets of features and respective weights comprise a common feature;
the first set of features and respective weights comprises a first weight for the common feature; and
the second set of features and respective weights comprises a second weight, different from the first weight, for the common feature.

25. The mobile access point (MAP) of claim 23, wherein the at least one module is operable to identify the first networking function by, at least in part, operating to select the identified networking function from a plurality of predefined networking functions.

26. A mobile access point (MAP) of a vehicle communication network, the MAP comprising:
at least one module operable to, at least:
for each of a plurality of reachable network nodes determine at least one vehicle-dependent feature;
identify a first networking function;
identify, based at least in part on the identified first networking function, a first set of features and respective weights for determining a first path score;
determine the first path score based at least in part on the identified first set of features and respective weights and on the vehicle-dependent feature;
determine a route for a communication based, at least in part, on the path score;
identify a second networking function;
identify, based at least in part on the identified second networking function, a second set of features and respective weights for determining a second path score, wherein the second set of features and respective weights is different from the first set of features and respective weights;
determine the second path score based at least in part on the identified second set of features and respective weights and on the vehicle-dependent feature; and
determine a second route for a second communication based, at least in part, on the second path score;
wherein:
the first and second sets of features and respective weights comprise a common feature;
the first set of features and respective weights comprises a first weight for the common feature; and
the second set of features and respective weights comprises a second weight, different from the first weight, for the common feature.

27. The mobile access point (MAP) of claim 26, wherein the at least one module is operable to identify the first networking function by, at least in part, operating to select the identified networking function from a plurality of predefined networking functions.

\* \* \* \* \*